United States Patent Office 3,135,412
Patented June 2, 1964

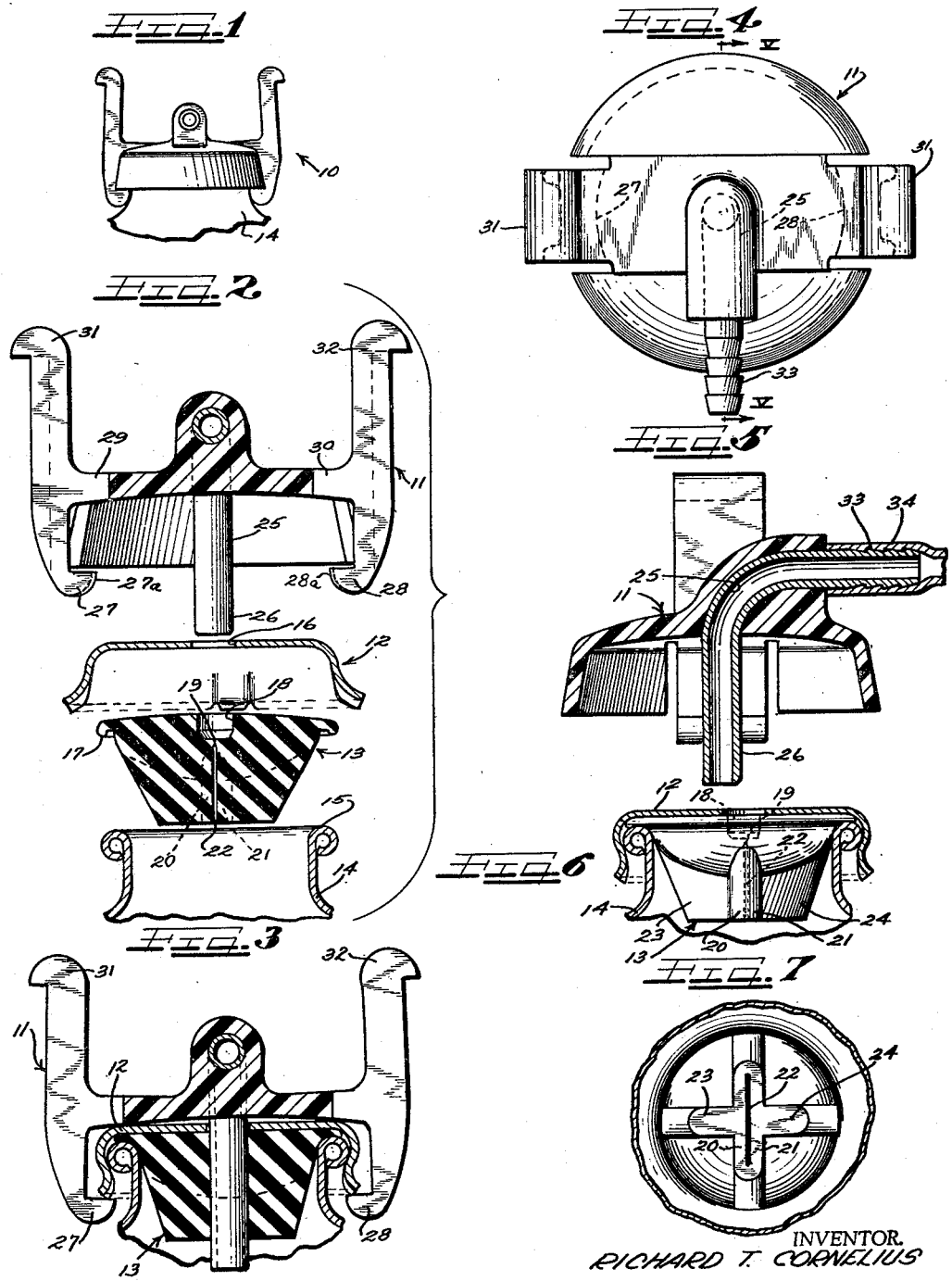

3,135,412
FLUID COUPLING
Richard T. Cornelius, Minneapolis, Minn., assignor to The Cornelius Company, Anoka, Minn., a corporation of Minnesota
Filed Mar. 8, 1962, Ser. No. 178,313
8 Claims. (Cl. 215—73)

This invention relates generally to separable fluid connectors, and more specifically to a fluid coupling adapted to be employed with a crown cap closure.

Although the principles of the present invention may be included in various fluid couplings associated with various devices, a particularly useful application is made when the same is incorporated with or used in connection with a vessel of the type employed for liquids containing carbon dioxide, such as soft drinks, seltzer water or charged water, and beer. It is known that when a container having such carbonated liquid is opened, a quantity of gas immediately escapes. If the vessel or container is subsequently tightly reclosed, such as after some liquid has been removed, carbon dioxide will gradually dissolve from the liquid into the air until an equilibrium condition is obtained. For each time that this cycle is repeated, more carbon dioxide gas is lost, and when this has occurred, it is said that the contents have gone "flat."

The present invention contemplates the provision of a novel fluid coupling by which access may be had to the interior of the vessel for removal of part of the liquid without the resulting loss in gas described above, any loss being held to a minimum. In this invention, the carbonated liquid may be removed with or without the assistance of gravity, without venting the vessel, since the liquid removed will be replaced by carbon dioxide from the remaining liquid until the vessel is substantially empty.

When the present invention is utilized, it becomes practicable to "open" or tap a bottle or can or other container of the type having a crown cap closure, without using the entire contents at the time of such access, since the cap is not removed.

Accordingly, it is an object of the present invention to provide an improved fluid coupling.

Another object of the present invention is to provide an improved fluid coupling section which may be incorporated as a part of the vessel closure.

Yet another object of the present invention is to provide a fluid coupling section which will coact with an apertured crown cap.

A still further object of the present invention is to provide a fluid coupling section which may be removably attached to a vessel in which attachment loss of any gases is minimized.

A still further object of the present invention is to provide a simple low-cost fluid coupling of the type described which may be attached and detached without the use of any auxiliary tool.

Many other advantages, features and additional objects of the present invention will become manifest to those versed in the art upon making reference to the detailed description and the accompanying sheet of drawings in which a preferred structural embodiment incorporating the principles of the present invention is shown by way of illustrative example.

On the drawings:

FIGURE 1 is a side elevational view of a fluid coupling assembly provided in accordance with the principles of the present invention, the same being shown as being attached to a vessel;

FIGURE 2 is an enlarged cross-sectional exploded view of the fluid coupling shown in FIGURE 1;

FIGURE 3 is a cross-sectional view of the elements shown in FIGURE 2, the same being illustrated in their assembled relationship;

FIGURE 4 is a top view of the structure shown in FIGURE 2;

FIGURE 5 is a cross-sectional view taken along line V—V of FIGURE 4;

FIGURE 6 is a cross-sectional view, partly in elevation, illustrating the assembled relationship of the lower three elements of FIGURE 2; and FIGURE 7 is a bottom view of the structure shown in FIGURE 6, the vessel being illustrated in cross-section.

As shown on the drawings:

The principles of this invention are particularly useful when embodied in a fluid coupling assembly such as illustrated in FIGURE 1, generally indicated by the numeral 10. The fluid coupling 10 includes, as best seen in FIGURES 2 and 3, a housing 11, a crown cap 12, and a molded member or valve 13. The fluid coupling 10 may be employed with any vessel or container 14 of the type having a mouth 15 with an external configuration adapted to be employed with conventional crown cap closures. Because of gas pressures and volumes which may develop in such vessel 14, the instant invention is particularly advantageous for use with such vessels 14 as may be made of metal, such as, by way of illustration, stainless steel or beer-can type of structure. It is to be understood that the exact details of the vessel 14 form no part of the instant invention, and the illustrated vessel 14 is included to show the coaction between the fluid coupling of this invention and a vessel 14 having a mouth 15 of the type adapted to be employed with conventional crown-type of closures, such mouth therefore being referred to herein as a crown-type of mouth.

The crown cap 12 of this invention is conventional, except for two features. The usual cork or other liner has been omitted, and a central aperture 16 has been provided therein. The molded member 13 is provided with a peripheral flange 17 having an upper side which engages the interior of the crown cap 12, and having a lower peripheral edge which engages the vessel mouth 15. When the crown cap 12 and the molded member 13 are assembled with the vessel 14, and the crown cap 12 is given the conventional crimping, a structure results as shown in FIGURE 6 wherein the molded member 13 acts as a liner for the cap 12 or gasket to form a peripheral seal with the mouth 15. To this end, and for other purposes, the member 13 preferably comprises a flexible resilient material such as rubber.

The molded member 13 has means defining a cylindrical recess 18 which has a diameter which is slightly smaller than the aperture 16. The recess 18 is coaxial with the cap aperture 16 and opens directly into it. At the bottom of the recess 18, the molded member 13 includes a normally closed yieldable portion 19 which is resiliently yieldable for access therethrough. Immediately beneath the recess 18 there is provided a pair of integral confronting flexible flanges 20, 21, disposed in side-by-side relation, and which have inner faces which mutually define an elongated slit 22. The slit 22 may open or close, and thus the flanges 20 and 21 may be also termed valve elements. The slit 22 is aligned with the recess 18, it extends axially substantially through the entire molded member 13, and is communicable with the recess 18. At the time of manufacture and installation, there is a very small quantity of imperforate material left between the upper end of the slit 22 and the bottom of the recess 18. This material insures against any gradual leakage of a very small rate. However, once this small quantity of material has been ruptured, the confronting flanges 20 and 21 serve to keep the slit 22 closed. It is thus apparent that the slit 22 is communicable with the recess 18 by either rupture of the small quantity of intervening material, or by re-separating the same if it has been previously ruptured.

The outer faces of the flanges 21 and 22 are exposed to whatever gas pressure there may be in the vessel 14. If the vessel be tilted, the outer faces of the flanges 20 and 21 are exposed to the static liquid pressure which may be present and acting thereon. Such forces may be quite slight, and even if this be the case, the pressure force within the vessel acts on the outer faces of the flanges 20 and 21 sufficiently to close or seal the slit 22.

To make sure that the inner faces of the flanges 20 and 21 are normally disposed in touching or substantially touching position, there is preferably also provided a pair of stiffener ribs or stiffener means 23, 24 each integral with the member 13, the stiffener rib 23 merging integrally with the outer face of the flange 20, and the stiffener rib 24 similarly merging with the outer face of the flange 21. Thus, the natural molecular forces within the resilient member 13, and more particularly in the flanges 20 and 21, serve to hold the slit 22 normally or substantially closed, such being aided by similar forces from the ribs 23, 24.

The housing 11 comprises semi-rigid plastic, and therefore preferably comprises a molded housing. The housing 11 includes an access stem 25, such as of steel, which is embedded and supported therein, as best seen in FIGURE 5. One end 26 of the access stem 25 has an outside diameter which is slightly smaller than the aperture 16 in the crown cap 12 so that it may be freely received therein. However, the outside diameter of the end 26 is slightly greater than the size of the recess 18, so that when it is pushed therethrough, the means or portion of the member 13 which defines the cylindrical wall of the recess 18 snugly engages the outside of the access stem end 26 to form a tight fluid seal therewith. Since the end 26 is straight, it will be seen that this seal is established before the end 26 ruptures or reopens the normally closed yieldable portion 19.

The housing 11 includes a pair of inwardly directed hooks 27, 28 which are integrally pivoted as at 29 and 30 to the housing 11. As best seen in FIGURE 3, the hooks 27 and 28 are thus not only pivoted and secured to the outer periphery of the housing 11, but are also engageable with or lockable to the outer periphery or crimped portion of the crown cap 12. Preferably the hooks 27 and 28 have a cam-like or lead-in surface 27a, 28a which may be employed to assist in sliding the hooks onto the crown cap, the portions 27a and 28a being concave as viewed from the cap for spanning a short peripheral segment thereof.

The housing 11 also includes a pair of manually manipulative hook extensions 31, 32 which are integral with the hooks and which extend in a common direction for grasping between the fingers for pivoting the hooks 27 and 28 apart slightly in response to squeezing on the ends of the extensions 31 and 32 by the fingers. The extensions 31 and 32 may thus be squeezed together to minimize the force needed to assemble the housing onto the crown cap, and may also be squeezed together to release the hooks 27 and 28 from the crown cap to enable removal of the housing 11 therefrom.

When the vessel 14 is ready to be initially sealed, the crown cap 12 and the resilient member 13 are placed in superposed positions as shown in FIGURE 2, moved axially together, and the cap 12 crimped to the position shown in FIGURE 6. This is the handling and storage condition of the coupling until the user is ready to obtain access thereto. The housing 11 is then aligned therewith, as shown in FIGURE 2, and the end 26 of the access stem 25 is inserted through the cap aperture 16, the molded member recess 18, the normally closed yieldable portion 19 and slit 22 into the interior of the vessel 14, as shown in FIGURES 1 and 3. Doing so pivots the hooks 27 and 28 apart, which movement may be manually assisted, and when the housing 11 is fully seated, the hooks 27, 28, tensionably engage beneath the lower edge of the crown cap 12, as shown in FIGURE 3. Thereafter, when the extensions 31 and 32 are brought together as by squeezing, the hooks 27 and 28 disengage enabling sliding axial removal of the housing 11, whereupon the slit 22 recloses.

The length of the end 26 of the access stem 25 is so chosen that it will extend into the liquid in the vessel 14. Since the instant structure may be used with vessels having various lengths, it is practical to employ a relatively short length as shown, coupled with tilting the vessel 14 to the extent needed to insure that the end 26 is immersed in the fluid to be discharged.

The other end of the access stem 25 is provided with friction means 33 for retaining a hose 34 thereon which may be pinched as a valve to prevent escape of gas or liquid. Of course, other known types of valves may be employed with the hose 34, and the access stem 25 may be adapted as at 33 to be joined to other known devices, such as seltzer valves.

Although various minor modifications might be suggested by those versed in the art, it should be understood that I wish to embody within the scope of the patent warranted hereon, all such embodiments as reasonably and properly come within the scope of my contribution to the art.

I claim as my invention:

1. A fluid coupling for a vessel having a crown-type of mouth comprising:
   (a) a crown cap having an aperture; and
   (b) a resilient molded member adapted to serve as a liner for said cap, and having means defining a cylindrical recess of a diameter slightly smaller than said cap aperture and opening toward and concentric with it, said member being normally closed and resiliently yieldable at the bottom of said recess, said recess-defining means being operative to receive therethrough, guide, and form a seal with an access stem of an external size intermediate that of said cap aperture and said recess.

2. A fluid coupling for a vessel having a crown-type of mouth comprising:
   (a) a crown cap having an aperture; and
   (b) a resilient molded member adapted to serve as a liner for said cap, and having means defining a cylindrical recess aligned with an opening toward said cap aperture, said member including further resilient means at the bottom of said recess defining a normally closed elongated flat slit communicable with said recess.

3. A fluid coupling for a vessel having a crown-type of mouth comprising:
   (a) a crown cap having an aperture;
   (b) a resilient molded member adapted to serve as a liner for said cap and pheripherally adapted to form a seal with the vessel mouth;
   (c) means integral with said resilient member defining a cylindrical recess coaxial with said cap aperture, and of a smaller diameter size, and opening into said cap aperture;
   (d) a pair of confronting flexible flanges integral with said member, and having flat inner faces jointly defining an elongated slit lying in a plane aligned with said recess, and having outer faces adapted to be urged together to a slit-sealing position by a slight pressure force within the vessel; and
   (e) stiffener means integral with said member and extending perpendicularly from said plane, and acting on said flanges to retain the slit normally substantially closed;

said recess and slit being receptive of an excess stem of a size intermediate said cap aperture and said recess which thereby forms a seal with said recess defining means, and said flanges being movable as a valve upon removal of such stem to a flatwise-abutting slit-closing position.

4. A fluid coupling for a vessel having a crown-type of closure cap comprising:
   (a) an access stem having one end receivable through an aperture in the closure; and
   (b) a housing supporting said stem and having hook means pivoted thereon, and said hook means being of such length as to be engageable with the axially directed outer periphery of said closure cap when the coupling is fully seated against the top of the crown cap.

5. A fluid coupling for a vessel having a crown-type of closure cap comprising:
   (a) an access stem having one end receivable through an aperture in the closure; and
   (b) a molded plastic housing in which said stem is fixedly embedded and supported, and having plastic hook means integral therewith and pivoted thereon and said hook means being of such length as to be graspingly engageable with the axially directed outer periphery of said closure cap when the coupling is fully seated against the top of the crown cap.

6. A fluid coupling for a vessel having a crown-type of closure cap comprising:
   (a) an access stem having one end receivable through an aperture in the closure;
   (b) a molded plastic housing in which said stem is fixedly embedded and supported;
   (c) a pair of inwardly directed plastic hooks integral with and pivoted on the outer periphery of said housing and engageable with the outer axially directed periphery of said closure cap; and
   (d) a pair of manually manipulative plastic extensions each integral with one of said hooks and extending away from said cap in a common axial direction.

7. A fluid coupling for a vessel having a crown-type of closure cap comprising:
   (a) an access stem having one end receivable through an aperture in the closuure;
   (b) a housing supporting said stem and having a pair of hook means pivoted thereon and engageable with the axially directed outer periphery of said closure cap; and
   (c) manually manipulative extension means integral with each of said hook means and extending in a common axial direction for effecting selective pivoting thereof.

8. A fluid coupling for a vessel having a crown-type of mouth comprising:
   (a) a crown cap having an aperture;
   (b) an excess stem having one end receivable through said cap aperture, said one end having a size slightly smaller than said aperture;
   (c) a molded plastic housing in which said stem is fixedly embedded and supported;
   (d) a pair of inwardly directed plastic hooks integral with and pivoted on the outer periphery of said housing and engageable with the outer axially directed periphery of said crown cap;
   (e) a pair of manually manipulative plastic extensions each integral with one of said hooks and extending in a common axial direction;
   (f) a resilient molded member adapted to serve as a liner for said cap and peripherally adapted to form a seal with the vessel mouth;
   (g) means integral with said resilient member defining a cylindrical recess coaxial with said cap aperture, and of a slightly smaller diameter than that of said one end of said stem, and opening into said cap aperture;
   (h) a pair of confronting flexible flanges integral with said member, and having inner flat faces jointly defining an elongated slit lying in a plane aligned with said recess, and having outer faces adapted to be urged together to a slit-sealing position by a slight pressure force within the vessel; and
   (i) stiffener means integral with said member and extending perpendicularly from said plane, and acting on said flanges to retain the slit normally substantially closed;

said recess and slit being removably receptive of said one end of said access stem, whereby a seal is formed by said recess-defining means, and said flanges being movable as a valve upon removal of said stem to a flatwise-abutting slit-closing position.

References Cited in the file of this patent
UNITED STATES PATENTS

| | | |
|---|---|---|
| 2,072,853 | Baxter | Mar. 9, 1937 |
| 2,114,583 | Adams | Apr. 19, 1938 |
| 2,200,600 | Grapp | May 14, 1940 |
| 2,241,097 | Mezzapesa | May 6, 1941 |
| 2,336,924 | Cordis | Dec. 14, 1943 |
| 2,608,972 | Chrigstrom | Sept. 2, 1952 |